(12) United States Patent
Pang et al.

(10) Patent No.: US 11,963,216 B2
(45) Date of Patent: Apr. 16, 2024

(54) CHANNEL ACCESS AND TRANSMISSION SCHEDULING FOR INDUSTRIAL WIRELESS COMMUNICATIONS

(71) Applicant: Hitachi Energy Switzerland AG, Baden (CH)

(72) Inventors: Zhibo Pang, Västerås (SE); Michele Luvisotto, Västerås (SE)

(73) Assignee: HITACHI ENERGY LTD, Zurich (CH)

( * ) Notice: Subject to any disclaimer, the term of this patent is extended or adjusted under 35 U.S.C. 154(b) by 0 days.

(21) Appl. No.: 17/045,107

(22) PCT Filed: Apr. 4, 2018

(86) PCT No.: PCT/EP2018/058547
§ 371 (c)(1),
(2) Date: Oct. 2, 2020

(87) PCT Pub. No.: WO2019/192683
PCT Pub. Date: Oct. 10, 2019

(65) Prior Publication Data
US 2021/0153225 A1  May 20, 2021

(51) Int. Cl.
*H04W 72/566* (2023.01)
*H04W 72/044* (2023.01)
(Continued)

(52) U.S. Cl.
CPC ....... *H04W 72/566* (2023.01); *H04W 72/044* (2013.01); *H04W 72/1268* (2013.01); *H04W 74/02* (2013.01)

(58) Field of Classification Search
CPC ........... H04W 72/1247; H04W 72/044; H04W 72/1268; H04W 74/02; H04W 74/04;
(Continued)

(56) References Cited

U.S. PATENT DOCUMENTS 6,487,183 B1 * 11/2002 Lo ...................... H04B 7/18582
370/347
8,199,686 B1 * 6/2012 Donovan ............ H04W 52/028
370/311
(Continued)

FOREIGN PATENT DOCUMENTS

CN 101061669 A 10/2007
CN 101193054 A 6/2008
(Continued)

*Primary Examiner* — Un C Cho
*Assistant Examiner* — Lalita W Pace
(74) *Attorney, Agent, or Firm* — Slater Matsil, LLP

(57) ABSTRACT

A method can be used for channel access in an industrial wireless network. A network controller allocates time/frequency resource units in a set of guaranteed timeslots to packet transceivers in the industrial wireless network. The guaranteed timeslots are timewise divided into slots and frequency wise divided into channels, where one slot-channel pair defines one time/frequency resource unit. The network controller provides to the packet transceivers information about the time/frequency resource units allocated to the packet transceivers. The packet transceivers map packets of their own traffic flows to their allocated time/frequency resource units in each set of guaranteed timeslots. The packets for each packet transceiver are mapped according to priority-based scheduling of its own traffic flows and independently of any mapping of packets of other packet transceivers in the industrial wireless network.

18 Claims, 6 Drawing Sheets

(51) Int. Cl.
*H04W 72/1268* (2023.01)
*H04W 74/02* (2009.01)

(58) Field of Classification Search
CPC ... H04W 72/02; H04W 72/12; H04W 72/121; H04W 72/1242; H04W 72/1205; H04W 72/0446; H04W 72/0453; H04W 72/1263; H04W 74/0816; H04W 72/40; H04W 72/50; H04W 72/51; H04W 72/512; H04W 72/566
See application file for complete search history.

(56) References Cited

U.S. PATENT DOCUMENTS

| | | | | |
|---|---|---|---|---|
| 8,989,211 | B2* | 3/2015 | Jeong | H04L 23/02 370/458 |
| 9,565,692 | B2 | 2/2017 | Haapola et al. | |
| 2007/0212071 | A1* | 9/2007 | Guo | H04L 47/564 398/69 |
| 2008/0080460 | A1* | 4/2008 | Ramkumar | H04W 74/02 370/342 |
| 2009/0238160 | A1* | 9/2009 | Bhatti | H04W 74/0808 370/338 |
| 2009/0310571 | A1* | 12/2009 | Matischek | H04W 4/70 370/336 |
| 2010/0265923 | A1* | 10/2010 | Choi | H04L 1/1887 370/336 |
| 2012/0069869 | A1* | 3/2012 | Jeong | H04W 28/18 375/132 |
| 2014/0133473 | A1* | 5/2014 | Shin | H04W 72/0446 370/336 |
| 2015/0319803 | A1* | 11/2015 | Hosny | H02H 7/262 702/60 |
| 2017/0325224 | A1* | 11/2017 | Shudark | H04B 1/7156 |
| 2019/0159201 | A1* | 5/2019 | Jin | H04W 72/1289 |

FOREIGN PATENT DOCUMENTS

| | | | | |
|---|---|---|---|---|
| CN | 102316594 | A | | 1/2012 |
| EP | 3082289 | A1 | | 10/2016 |
| KR | 100742776 | B1 | * | 7/2007 |
| WO | 03063434 | A2 | | 7/2003 |
| WO | 2006067271 | A1 | | 6/2006 |
| WO | 2006102744 | A1 | | 10/2006 |
| WO | WO-2011038692 | A1 | * | 4/2011 ............ H04W 84/18 |

* cited by examiner

CHANNEL ACCESS AND TRANSMISSION SCHEDULING FOR INDUSTRIAL WIRELESS COMMUNICATIONS

CROSS-REFERENCE TO RELATED APPLICATIONS

This application is a national stage application of International Application No. PCT/EP2018/058547, filed on Apr. 4, 2018, which application is hereby incorporated herein by reference.

TECHNICAL FIELD

Embodiments presented herein relate to methods, a network controller, packet transceivers, computer programs, and a computer program product for channel access in an industrial wireless network.

BACKGROUND

Industrial communications systems are commonly used in power grid control applications (e.g. for substation automation) to enable equipment control and monitoring. These communications systems have hence to accommodate different types of traffic, coming from informational technology (IT) infrastructure (e.g. remote monitoring devices, metering devices, etc.) as well as from operational technology (OT) infrastructure (e.g. control systems). Different traffic flows have different specific requirements in terms of determinism, latency and reliability, which should be taken into account when the protocol stack and, in particular, the medium access control (MAC) layer in the protocol stack, is designed.

In this regard, the IEEE time-sensitive networking (TSN) working group is developing new standards that allow precise scheduling of heterogeneous traffic flows at the MAC layer of Ethernet networks. Thanks to the usage of time-aware shaper and preemption mechanisms, TSN is able to guarantee to each traffic flow a bounded worst-case latency as well as to implement redundancy and fault tolerance.

When wireless networks are considered for industrial communications systems, channel access protocols become even more important in order to avoid packet collisions. TSN mechanisms cannot be implemented directly since they rely on the presence of a switch that controls all the transmissions in the industrial communications system. Consequently, time-slotted channel access organized through periodic superframes is generally adopted, as in IEEE 802.15.4e MAC for low-power, timely and reliable wireless personal area networks (WPANs). This standard, however, does not take into account the possibility of scheduling heterogeneous traffic flows with different priorities and it is generally limited by the underlying IEEE 802.15.4 physical layer.

In view of the above, it can be concluded that the design of protocol layers, such as the MAC layer, in wireless networks employed in power grid control applications (e.g. substation automation) is crucial to ensure that the required performance in terms of determinism, latency and reliability are achieved. As noted above, although IEEE TSN can be used in Ethernet networks to schedule traffic flows with different priorities, in wireless networks, however, TSN is not applicable directly. Time-slotted protocols, such as the one proposed in IEEE 802.15.4e, are generally employed to regulate channel access and avoid collisions, but they lack the flexibility in handling different traffic priorities that TSN provides.

Hence, there is still a need for improved scheduling of resources to nodes in an industrial wireless network.

SUMMARY

An object of embodiments herein is to provide efficient scheduling of resources to nodes in an industrial wireless network. This is achieved by the herein disclosed mechanisms for channel access in an industrial wireless network.

According to a first aspect there is presented a method for channel access in an industrial wireless network. The method comprises allocating, by a network controller and to packet transceivers in the industrial wireless network, time/frequency resource units in a set of guaranteed timeslots. The guaranteed timeslots are timewise divided into slots and frequency wise divided into channels, where one slot-channel pair defines one time/frequency resource unit. The method comprises providing, by the network controller and to the packet transceivers, information about the time/frequency resource units allocated to the packet transceivers. The method comprises mapping, by the packet transceivers, packets of their own traffic flows to their allocated time/frequency resource units in each set of guaranteed timeslots. The packets for each packet transceiver are mapped according to priority-based scheduling of its own traffic flows and independently of any mapping of packets of other packet transceivers in the industrial wireless network.

According to a second aspect there is presented a system for channel access in an industrial wireless network. The system comprises a network controller and packet transceivers. The network controller is configured to allocate, to packet transceivers in the industrial wireless network, time/frequency resource units in a set of guaranteed timeslots. The guaranteed timeslots are timewise divided into slots and frequency wise divided into channels, where one slot-channel pair defines one time/frequency resource unit. The network node is further configured to provide, to the packet transceivers, information about the time/frequency resource units allocated to the packet transceivers. The packet transceivers are configured to map packets of their own traffic flows to their allocated time/frequency resource units in each set of guaranteed timeslots. The packets for each packet transceiver are mapped according to priority-based scheduling of its own traffic flows and independently of any mapping of packets of other packet transceivers in the industrial wireless network.

According to a third aspect there is presented a computer program for channel access in an industrial wireless network. The computer program comprises computer program code which, when run on processing circuitry of a network controller and packet transceivers, causes the network controller and the packet transceivers to perform a method according to the first aspect.

According to a fourth aspect there is presented a method for channel access in an industrial wireless network. The method is performed by a packet transceiver in the industrial wireless network. The method comprises obtaining, from a network controller of the industrial wireless network, information about time/frequency resource units allocated to the packet transceiver. The time/frequency resource units are provided in a set of guaranteed timeslots. The guaranteed timeslots are timewise divided into slots and frequency wise divided into channels, and where one slot-channel pair defines one time/frequency resource unit. The method comprises mapping packets of its own traffic flows to its allocated time/frequency resource units in each set of guaranteed timeslots. The packets are mapped according to priority-based scheduling of the traffic flows of the packet transceiver and independently of any mapping of packets of other packet transceivers in the industrial wireless network.

According to a fifth aspect there is presented a packet transceiver for channel access in an industrial wireless network. The packet transceiver comprises processing circuitry. The processing circuitry is configured to cause the packet transceiver to obtain, from a network controller of the industrial wireless network, information about time/frequency resource units allocated to the packet transceiver. The time/frequency resource units are provided in a set of guaranteed timeslots. The guaranteed timeslots are timewise divided into slots and frequency wise divided into channels, and where one slot-channel pair defines one time/frequency resource unit. The processing circuitry is configured to cause the packet transceiver to map packets of its own traffic flows to its allocated time/frequency resource units in each set of guaranteed timeslots. The packets are mapped according to priority-based scheduling of the traffic flows of the packet transceiver and independently of any mapping of packets of other packet transceivers in the industrial wireless network.

According to a sixth aspect there is presented a computer program for channel access in an industrial wireless network, the computer program comprising computer program code which, when run on processing circuitry of a packet transceiver, causes the packet transceiver to perform a method according to the fourth aspect.

According to a seventh aspect there is presented a computer program product comprising a computer program according to at least one of the third aspect and the sixth aspect and a computer readable storage medium on which the computer program is stored. The computer readable storage medium could be a non-transitory computer readable storage medium.

Advantageously these methods, this network controller, these packet transceivers, and these computer programs enable efficient scheduling of resources to the packet transceivers in an industrial wireless network.

Advantageously these methods, this network controller, these packet transceivers, and these computer programs provide a combination of centralized resource allocation with local scheduling.

Advantageously these methods, these network controllers, these packet transceivers, and these computer programs combine the advantages of a time-slotted access to the channel (as in IEEE 802.15.4e) with the possibility for applications (as presented by the packet transceivers) to use TSN scheduling primitives for heterogeneous traffic flows.

Advantageously these methods, this network controller, these packet transceivers, and these computer programs combine the flexibility of TSN and the time-slotted access of IEEE 802.15.4e.

Advantageously these methods, this network controller, these packet transceivers, and these computer programs enable a bounded worst-case latency for deterministic traffic flows to be given, taking into account the scheduling policies of the packet transceivers and the resource allocation scheme of the network controller.

Advantageously these methods, this network controller, these packet transceivers, and these computer programs enable TSN mechanisms to be effectively implemented over an industrial wireless network, allowing seamless compatibility for upper protocol stack layers (e.g. network layer and application layer).

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
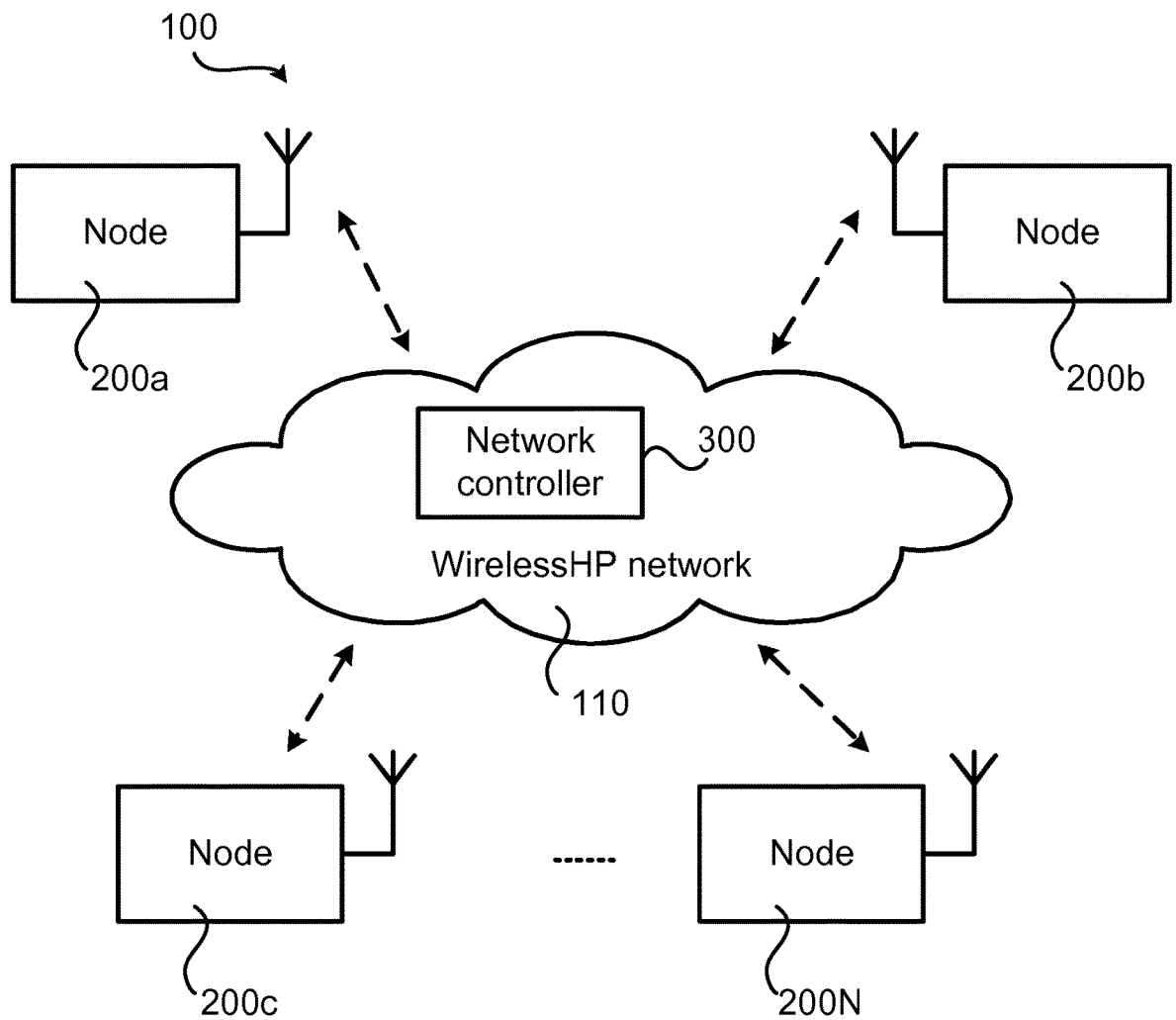
FIG. 1 is a schematic diagram illustrating a wireless communications network according to embodiments.

FIG. 1 schematically illustrates a wireless communications network 100 wherein the herein disclosed embodiments apply. Network entities denoted nodes 200a, 200b, . . . , 200N are equipped with a radio frequency (RF) front-end that allows them to communicate over a wireless network 110. Each node may represent a component of a substation automation system, such as a gateway, circuit breaker, circuit protector, transformer, switchgear, etc., that is configured for exchanging control messages. Each node 200a, 200b, . . . , 200N may selectively act as a packet transmitter or a packet receiver and are therefore hereinafter collectively referred to as packet transceivers 200a, 200b, . . . , 200N.

The topology of the network 100 is not limited to a star structure, where the nodes, such as the packet transceivers 200a, 200b, . . . , 200N, can communicate only with the network controller 300. Thus, in some aspects node-to-node communication is allowed in resource units (RUs) allocated to the nodes. In this way line, tree and mesh topologies can be easily built.

As disclosed above there is a need for improved scheduling of resources to nodes (as herein exemplified by the packet transceivers 200a, 200b, . . . , 200N) in an industrial wireless network 100. A network controller 300 is therefore provided in the network 100. The network controller 200 is configured to communicate with all the packet transceivers 200a, 200b, . . . , 200N in the network 100. Further functionality of the network controller 300 will be disclosed below.

The MAC layer in industrial wireless networks should ensure low-latency, reliable and deterministic communications. An effective mechanism for channel access in industrial wireless networks should thus combine the scheduling mechanisms available in TSN with the time-slotted superframe structure of IEEE 802.15.4e. To this aim, at least some of the embodiments disclosed herein therefore provide a mechanism that combines the advantages of IEEE 802.15.4e time-slotted channel access and IEEE TSN priority-based scheduling.

The embodiments disclosed herein in particular relate to mechanisms for channel access in an industrial wireless network 100. In order to obtain such mechanisms there is provided a network controller 300, packet transceivers 200a, 200b, . . . , 200N, methods performed by the network controller 300 and the packet transceivers 200a, 200b, . . . , 200N, computer program products comprising code, for example in the form of a computer program, that when run on processing circuitry of the network controller 300 and the packet transceivers 200a, 200b, . . . , 200N, cause the network controller 300 and the packet transceivers 200a, 200b, . . . , 200N to perform the methods.

Figure 2:
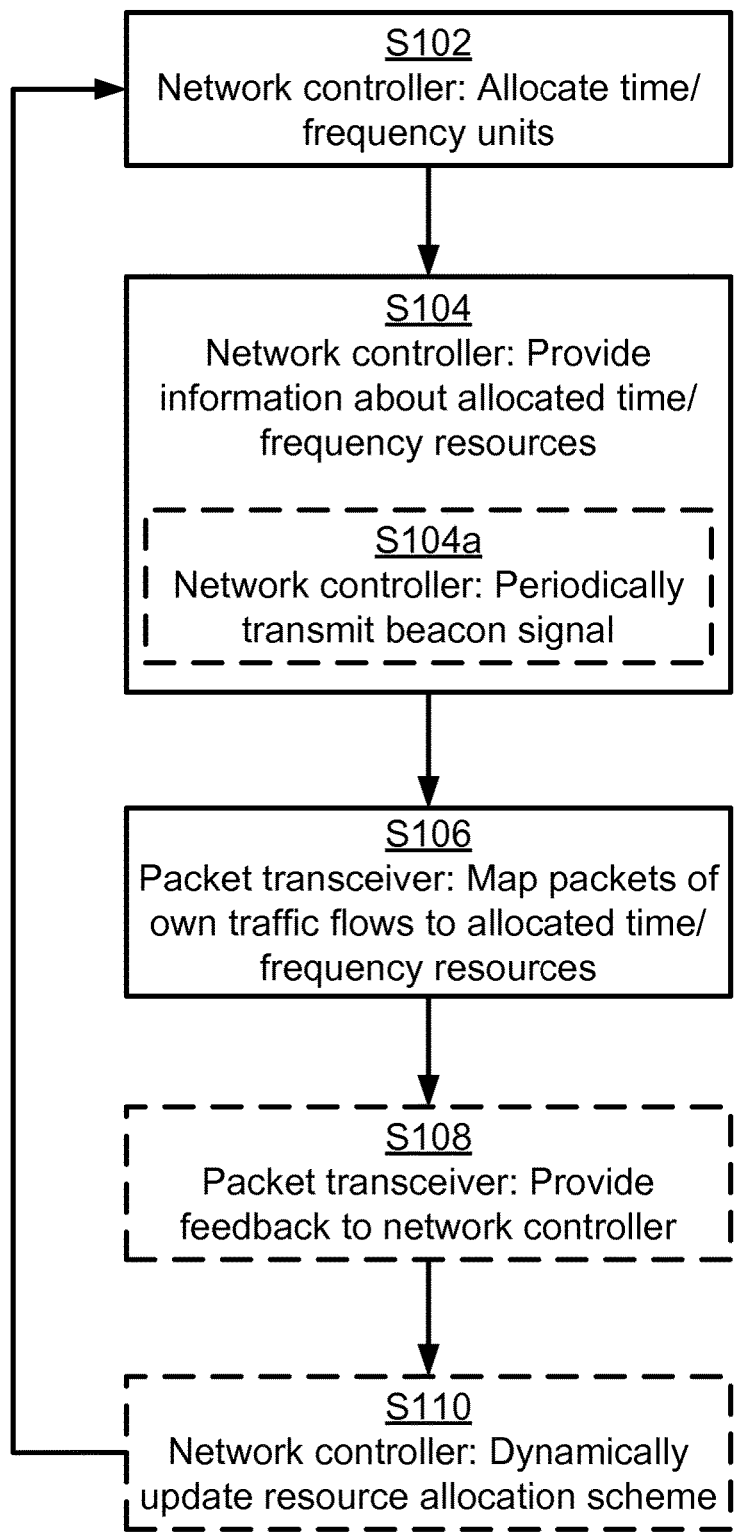
FIGS. 2 and 6 are flowcharts of methods according to embodiments.

Reference is now made to FIG. 2 illustrating a method for channel access in an industrial wireless network 100 as performed by the network controller 300 and the packet transceivers 200a, 200b, . . . , 200N according to an embodiment.

The network controller 300 allocates time/frequency resource units to the packet transceivers 200a, 200b, . . . , 200N in the industrial wireless network 100. Hence, the network controller 300 is configured to perform step S102:

S102: The network controller 300 allocates time/frequency resource units in a set of guaranteed timeslots 420 to the packet transceivers 200a, 200b, . . . , 200N in the industrial wireless network 100.

Thanks to multichannel capabilities, multiple time/frequency resource units can be allocated during the same timeslot. The guaranteed timeslots 420 are thus timewise divided into slots and frequency wise divided into channels. One slot-channel pair defines one time/frequency resource unit. Hence, a time/frequency resource unit can be defined by a pair (s, c) with s defining the slot number and c defining the channel number.

The packet transceivers 200a, 200b, . . . , 200N are then made aware of their allocated time/frequency resource units. Hence, the network controller 300 is configured to perform step S104:

S104: The network controller 300 provides, to the packet transceivers 200a, 200b, . . . , 200N, information about the time/frequency resource units allocated to the packet transceivers 200a, 200b, . . . , 200N.

The packet transceivers 200a, 200b, . . . , 200N can then individually map their traffic flows to the allocated time/frequency resource units according to priority-based scheduling. Hence, the packet transceivers 200a, 200b, . . . , 200N are configured to perform step S106:

S106: The packet transceivers 200a, 200b, . . . , 200N map packets of their own traffic flows to their allocated time/frequency resource units in each set of guaranteed timeslots 420. The packets for each packet transceiver 200a are mapped according to priority-based scheduling of their own traffic flows and independently of any mapping of packets of other packet transceivers 200b, . . . , 200N in the industrial wireless network 100.

Embodiments relating to further details of channel access in an industrial wireless network as performed by the network controller 300 and the packet transceivers 200a, 200b, . . . , 200N will now be disclosed.

According to an embodiment the resource allocation is performed at MAC layer.

Figure 3:
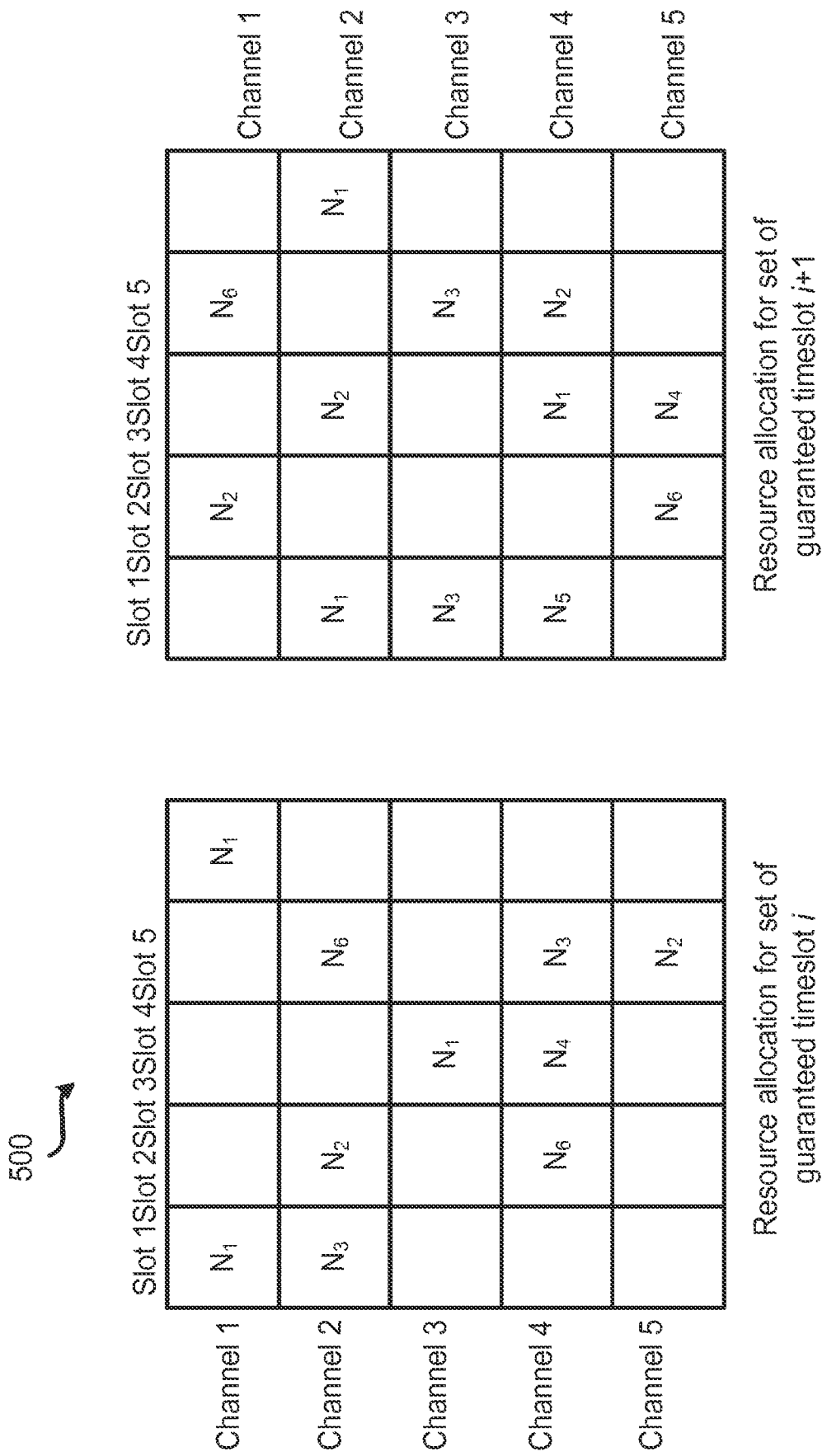
FIG. 3 is a schematic illustration of resource allocation schemes according to an embodiment.

There might be different ways to provide the information of the allocated time/frequency resource units. One way is to provide the information in a resource allocation scheme. According to an embodiment information of the allocated time/frequency resource units for each packet transceiver 200a, 200b, . . . , 200N is thus provided in a resource allocation scheme. FIG. 3 illustrates an example of a resource allocation scheme 500 for two consecutive guaranteed timeslots 420 (with timeslots indices i and i+1). As in the example of FIG. 3, each time/frequency resource unit can be allocated to a packet transceiver 200a, 200b, . . . , 200N, and thus be used, or remain unused.

There could be different allocations of time/frequency resource units for the different packet transceivers 200a, 200b, . . . , 200N.

According to a first example at least one of the packet transceivers 200a, 200b, . . . , 200N is allocated at least two time/frequency resource units within the set of guaranteed timeslots 420. According to the illustrative example of FIG. 3 this is the case for packet transceivers denoted N1, N2, N3, and N6. These at least two time/frequency resource units might allocate mutually different slots and/or channels such that the time/frequency resource units per packet transceiver 200a, 200b, . . . , 200N are spread out in time and/or frequency. According to another example at least one of the packet transceivers 200a, 200b, . . . , 200N is allocated, on average, less than one time/frequency resource unit per guaranteed timeslot. According to the illustrative example of FIG. 3 this is the case for the packet transceiver denoted N5. Further, according to the illustrative example of FIG. 3, the packet transceiver denoted N2 has two allocated time/frequency resource units in guaranteed timeslot i and three allocated time/frequency resource units in guaranteed timeslot i+1.

In some aspects the allocation of time/frequency resource units is uniform for the different packet transceivers 200a, 200b, . . . , 200N, where all packet transceivers 200a, 200b, . . . , 200N thus are allocated the same amount of time/frequency resource units per guaranteed timeslot. In other aspects there are at least two packet transceivers that are not allocated the same amount of time/frequency resource units per guaranteed timeslot.

As disclosed above, the time/frequency resource units allocated for a packet transceiver 200a might allocate mutually different slots and/or channels such that the time/frequency resource units per packet transceiver 200a, 200b, . . . , 200N are spread out in time and/or frequency within the set of guaranteed timeslots 420. In some aspects the slots and/or channels in which the time/frequency resource units are located for a given packet transceiver change from one set of guaranteed timeslots 420 to the next set of guaranteed timeslots 420. Particularly, according to an embodiment a frequency-hopping pattern for the allocated time/frequency resource units in the resource allocation scheme 500 is applied between consecutive guaranteed timeslots 420. That is, in some aspects a frequency-hopping pattern is applied between consecutive guaranteed timeslots 420. In the example of FIG. 3, during slot 1, packet transceiver N1 is allocated time/frequency resource units in channel 1 in guaranteed timeslot i and in channel 2 in guaranteed timeslot i+1. This allows a high robustness to external interference and multipath fading in the industrial wireless network 100.

There might be different ways for the network controller to provide the information to the packet transceivers 200a, 200b, ..., 200N in step S104.

According to an embodiment the network controller 300 is configured to perform (optional) step S104a:

S104a: The network controller 300 periodically transmits a beacon signal 410.

In some aspects step S104a is performed as part of step S104.

In some aspects the information about the time/frequency resource units allocated to the packet transceivers 200a, 200b, ..., 200N is provided in the beacon signal 410. Particularly, according to an embodiment the beacon signal 410 comprises the resource allocation scheme 500. That is, the beacon signal 410 might comprise the resource allocation scheme 500 to be employed during the set of guaranteed timeslots 420.

The beacon signal 410 might have further purposes and might be used by the network controller 300 to provide further information to the packet transceivers 200a, 200b, ..., 200N. For example, the beacon signal 410 might serve as a synchronization signal. Particularly, according to an embodiment the beacon signal comprises time synchronization information for the packet transceivers 200a, 200b, ..., 200N. Each packet transceiver 200a, 200b, ..., 200N could thereby perform a periodic readjustment of its internal clock as needed. As an example, the time synchronization information could be provided as a timestamp of the master clock of the network controller 300.

Figure 4:
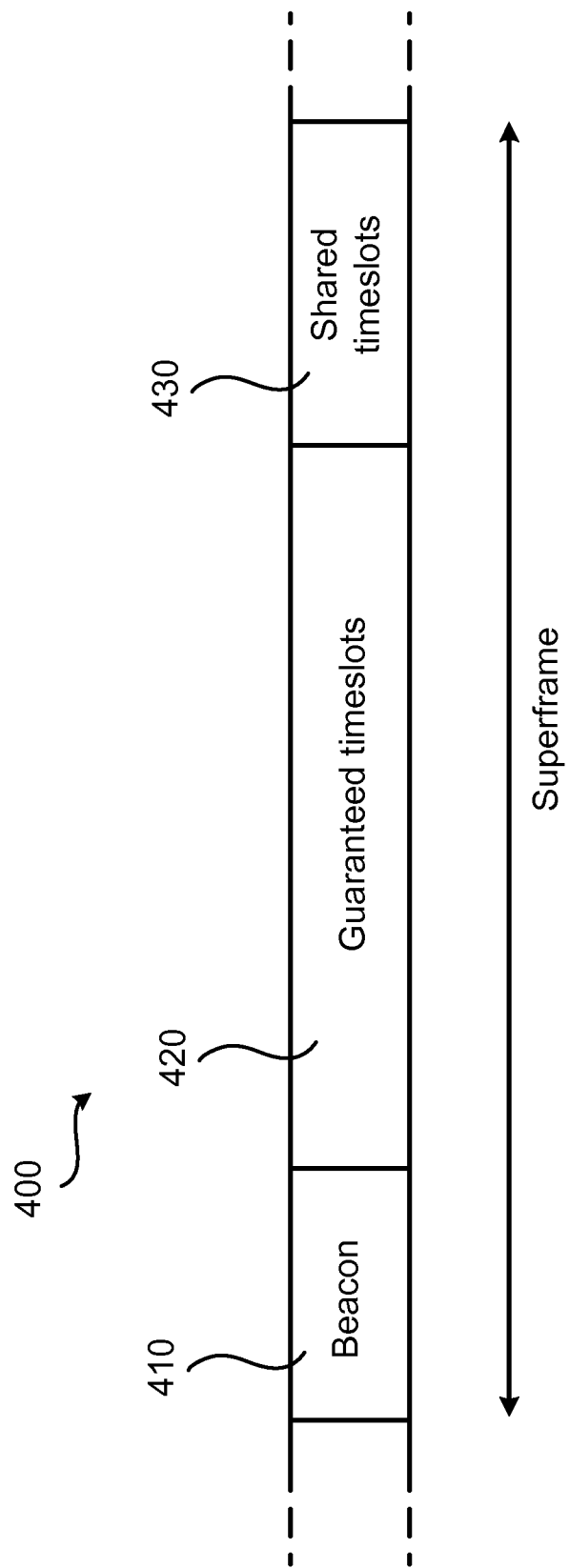
FIG. 4 is a schematic illustration of a superframe according to an embodiment.

Intermediate reference is now made to FIG. 4. FIG. 4 schematically illustrates the structure of a superframe 400 in which a guaranteed timeslot 420 is provided. A beacon signal 410 could indicate the beginning of the superframe 400. The packet transceivers 200a, 200b, ..., 200N are, by means of the guaranteed timeslots 420, guaranteed one or more time/frequency resource units in the superframe 400. One or more packet transceiver 200a, 200b, ..., 200N might, additionally, allocate time/frequency resource units among one or more shared timeslots 430. As in the illustrative example of FIG. 4, in some aspects one occurrence of the beacon signal 410, one occurrence of a set of guaranteed timeslots 420 and one occurrence of a set of shared timeslots 430 define one superframe 400. The superframe 400 might thus further comprise the one or more shared timeslots 430. Particularly, according to an embodiment a set of shared timeslots 430 follows each set of guaranteed timeslots 420. The shared timeslots 430 might be opportunistically allocatable by each packet transceiver 200a, 200b, ..., 200N. In this respect, each packet transceiver 200a, 200b, ..., 200N might use carrier-sense multiple access with collision avoidance (CSMA/CA) when sensing whether any of the shared timeslots 430 are free to use or not.

Figure 5:
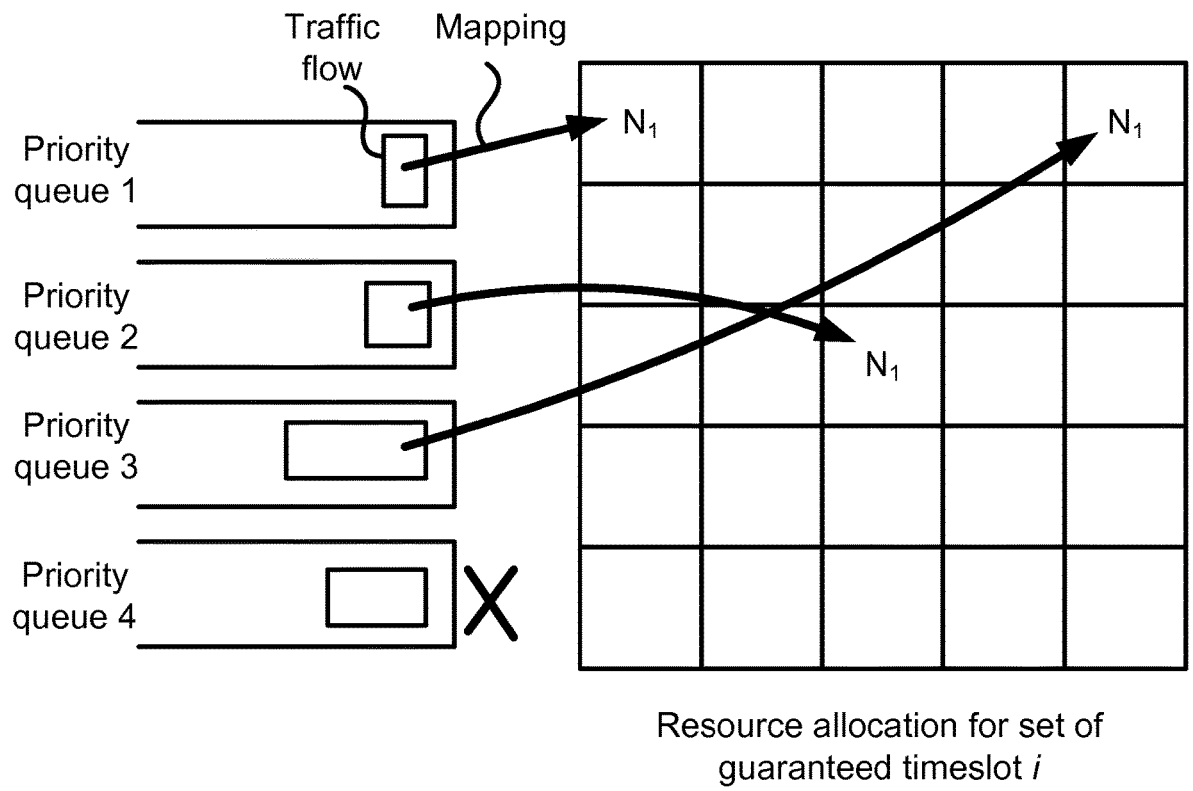
FIG. 5 is a schematic illustration of mapping of traffic flows to time/frequency resource units according to an embodiment.

Each packet transceiver 200a, 200b, ..., 200N might maintain different transmission queues for its traffic flows, where the transmission queues are characterized by heterogeneous priorities. Intermediate reference is now made to FIG. 5. FIG. 5 schematically illustrates the mapping of traffic flows to time/frequency resource units in a set of guaranteed timeslots for the packet transceiver denoted N1. As disclosed above, after receiving the information about allocated time/frequency resource units, the packet transceivers 200a, 200b, ..., 200N map pending packets to the allocated time/frequency resource units according to priority-based scheduling. In the present example the packet transceiver denoted N1 has four traffic flows, each represented by its own priority queue (priority queue 1, ..., priority queue 4). These priority queues are mapped, according to their priority, to the time/frequency resource units allocated to packet transceiver N1 in the set of guaranteed timeslots i. Physical layer parameters (e.g., modulation, coding, etc.) of each transmission might be optimized so that the packet size matches with the size of the time/frequency resource units. If a new packet arrives in a priority queue after the information provided by the network controller 300 in step S104 is received, this new packet can be mapped to one of the allocated time/frequency resource units in the present set of guaranteed timeslots if these allocated time/frequency resource units were originally destined to lower-priority packets. This can be the case also for retransmissions; if a high-priority packet transmission fails, the packet can be retransmitted in the next available allocated time/frequency resource unit, moving already scheduled packets to the next available allocated time/frequency resource units or the next set of guaranteed timeslots. In the present example the packet transceiver denoted N1 has three allocated time/frequency resource units in the present set of guaranteed timeslots and hence the traffic flow with lowest priority (in the present example from priority queue 4) is not mapped to any the time/frequency resource units in the present guaranteed timeslot. In the present example the packet transceiver denoted N1 might thus have a need for more allocated time/frequency resource units per set of guaranteed timeslots.

That is, in some cases there might be more pending packets than available time/frequency resource units. The packet transceiver 200a, 200b, ..., 200N might then wait for the next set of guaranteed timeslots to schedule these packets or attempt transmitting them in the shared timeslots 430. That is, as disclosed above, the traffic flow from priority queue 4 might be allocated in a shared timeslot 430.

If this situation happens on a regular basis, the packet transceivers 200a, 200b, ..., 200N might negotiate the allocation of more time/frequency resource units per set of guaranteed timeslots 420 with the network controller 300. That is, in order to avoid over-utilization or under-utilization of the allocated time/frequency resource units the packet transceivers 200a, 200b, ..., 200N might report feedback to the network controller 300. Thus, in some aspects the packet transceivers 200a, 200b, ..., 200N reports back to the network controller 300 information about the actual usage of the allocated time/frequency resource units. Hence, according to an embodiment the packet transceivers 200a, 200b, ..., 200N are configured to perform (optional) step S108:

S108: The packet transceivers 200a, 200b, ..., 200N provides feedback to the network controller 300. The feedback relates to usage of the allocated time/frequency resource units. For example the feedback from each packet transceiver 200a, 200b, ..., 200N might inform the network controller 300 that the allocated time/frequency resource units are under-utilized, or over-utilized, or match the needs of the packet transceiver 200a, 200b, . . . , 200N for transmitting the packets in its traffic flows. The feedback might be transmitted in dedicated management frames. The feedback might be transmitted in the shared timeslots 430 or through a dedicated management channel.

The network controller 300 could utilize the feedback to update the resource allocation scheme 500 such that the allocated time/frequency resource units to each packet transceiver 200a, 200b, . . . , 200N better matches the actual need for each packet transceivers 200a, 200b, . . . , 200N. Hence, according to an embodiment the network controller 300 is configured to perform (optional) step S110:

S110: The network controller 300 dynamically updates the resource allocation scheme 500 according to the feedback obtained by the network controller 300 from the packet transceivers 200a, 200b, . . . , 200N.

Figure 6:
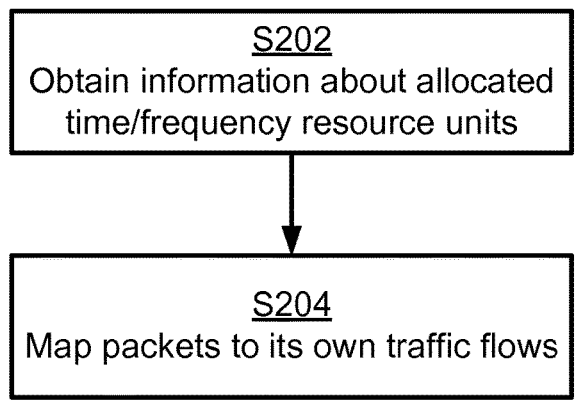

Reference is now made to FIG. 6 illustrating a method for channel access in an industrial wireless network 100 as performed by one of the the packet transceivers 200a, 200b, . . . , 200N in the industrial wireless network 100 according to an embodiment.

As disclosed above, the network controller 300 in step S104 provides information about time/frequency resource units allocated to each packet transceiver 200a, 200b, . . . , 200N. Hence, the packet transceiver 200a is configured to perform step S202:

S202: The packet transceiver 200a obtains, from the network controller 300 of the industrial wireless network 100, information about time/frequency resource units allocated to the packet transceiver 200a. as disclosed above, The time/frequency resource units are provided in a set of guaranteed timeslots 420, and the guaranteed timeslots 420 are timewise divided into slots and frequency wise divided into channels, and one slot-channel pair defines one time/frequency resource unit.

As in step S106 the packet transceiver 200a maps its own traffic flows to its allocated time/frequency resource units. That is, the packet transceiver 200a is configured to perform step S204:

S202: The packet transceiver 200a maps packets of its own traffic flows to its allocated time/frequency resource units in each set of guaranteed timeslots 420. As disclosed above, the packets are mapped according to priority-based scheduling of the traffic flows of the packet transceiver 200a and independently of any mapping of packets of other packet transceivers 200b, . . . , 200N in the industrial wireless network 100.

Embodiments, aspects, and examples as disclosed with reference to FIGS. 2, 3, 4, and 5 are also applicable to the method as performed by the packet transceiver 200a with reference to FIG. 6.

Figure 7:
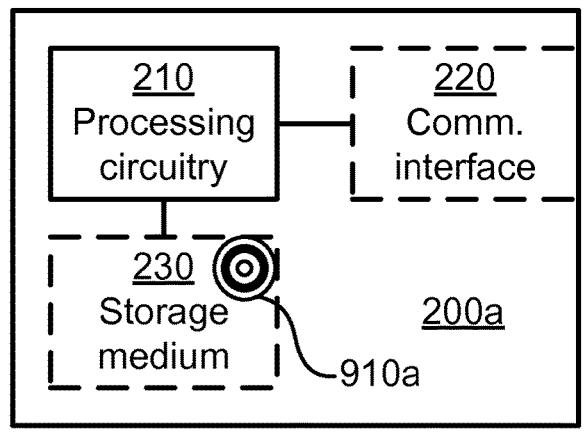
FIG. 7 is a schematic diagram showing functional units of a packet transceiver according to an embodiment.

FIG. 7 schematically illustrates, in terms of a number of functional units, the components of a packet transceiver 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the packet transceiver 200a to perform a set of operations, or steps, as disclosed above. For example, the storage medium 230 may store the set of operations, and the processing circuitry 210 may be configured to retrieve the set of operations from the storage medium 230 to cause the packet transceiver 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The packet transceiver 200a may further comprise a communications interface 220 for communications with other entities, notes, functions, and devices, such as the packet transceivers 200b, . . . , 200N and the network controller 300 in the network 100. As such the communications interface 220 may comprise one or more transmitters and receivers, comprising analogue and digital components.

The processing circuitry 210 controls the general operation of the packet transceiver 200a e.g. by sending data and control signals to the communications interface 220 and the storage medium 230, by receiving data and reports from the communications interface 220, and by retrieving data and instructions from the storage medium 230. Other components, as well as the related functionality, of the packet transceiver 200a are omitted in order not to obscure the concepts presented herein.

Figure 8:
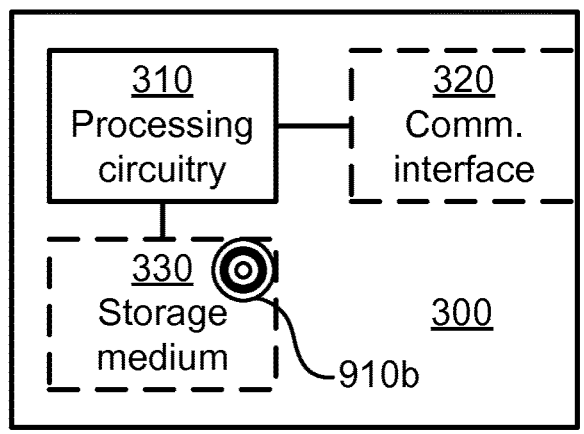
FIG. 8 is a schematic diagram showing functional units of a network controller according to an embodiment.

FIG. 8 schematically illustrates, in terms of a number of functional units, the components of a network controller 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 330. The processing circuitry 310 may further be provided as at least one application specific integrated circuit (ASIC), or field programmable gate array (FPGA).

Particularly, the processing circuitry 310 is configured to cause the network controller 300 to perform a set of operations, or steps, as disclosed above. For example, the storage medium 330 may store the set of operations, and the processing circuitry 310 may be configured to retrieve the set of operations from the storage medium 330 to cause the network controller 300 to perform the set of operations. The set of operations may be provided as a set of executable instructions. Thus the processing circuitry 310 is thereby arranged to execute methods as herein disclosed.

The storage medium 3 may also comprise persistent storage, which, for example, can be any single one or combination of magnetic memory, optical memory, solid state memory or even remotely mounted memory.

The network controller 300 may further comprise a communications interface 320 for communications with other entities, notes, functions, and devices, such as the packet transceivers 200a, 200b, . . . , 200N in the network 100. As such the communications interface 320 may comprise one or more transmitters and receivers, comprising analogue and digital components.

The processing circuitry 310 controls the general operation of the network controller 300 e.g. by sending data and control signals to the communications interface 320 and the storage medium 330, by receiving data and reports from the communications interface 320, and by retrieving data and instructions from the storage medium 330. Other components, as well as the related functionality, of the network controller 300 are omitted in order not to obscure the concepts presented herein.

Figure 9:
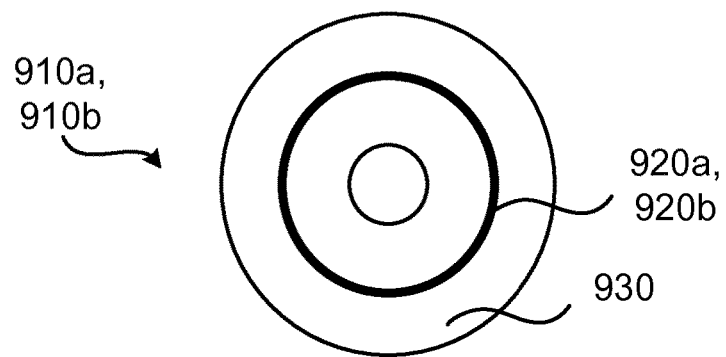
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920a and/or computer program product 910a may thus provide means for performing any steps of the packet transceiver 200a as herein disclosed. On this computer readable means 930, a computer program 920b can be stored, which computer program 920b can cause the processing circuitry 310 and thereto operatively coupled entities and devices, such as the communications interface 320 and the storage medium 330, to execute methods according to embodiments described herein. The computer program 920b and/or computer program product 910b may thus provide means for performing any steps of the network controller 300 as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for channel access in an industrial wireless network, the method comprising:
   allocating, by a network controller and to packet transceivers in the industrial wireless network, time/frequency resource units in a set of guaranteed timeslots, wherein the guaranteed timeslots are timewise divided into slots and frequency wise divided into channels, where one slot-channel pair defines one time/frequency resource unit, at least two allocated time frequency/resource units sharing a slot, wherein information of the allocated time/frequency resource units for each packet transceiver is provided in a resource allocation scheme, wherein a frequency hopping pattern for the allocated time/frequency resource units in the resource allocation scheme is applied between consecutive guaranteed timeslots, the consecutive guaranteed timeslots not being separated by a shared timeslot, wherein each allocated time/frequency resource unit is allocated to a single packet transceiver;
   providing, by the network controller and to the packet transceivers, information about the time/frequency resource units allocated to the packet transceivers;
   mapping, by the packet transceivers, packets of their own traffic flows to their allocated time/frequency resource units in each set of guaranteed timeslots, wherein the packets for each packet transceiver are mapped according to priority based scheduling of its own traffic flows and independently of any mapping of packets of other packet transceivers in the industrial wireless network;
   after mapping, by the packet transceivers, packets of their own traffic flows to their allocated time/frequency resource units in each set of guaranteed timeslots, providing feedback, from the packet transceivers and to the network controller about usage of the allocated time/frequency resource units; and
   dynamically updating, by the network controller, the resource allocation scheme according to the feedback as obtained by the network controller from the packet transceivers.

2. The method according to claim 1, wherein at least one of the packet transceivers is allocated at least two time/frequency resource units within the set of guaranteed timeslots.

3. The method according to claim 2, wherein the at least two time/frequency resource units allocate mutually different slots and/or channels such that the time/frequency resource units per packet transceiver are spread out in time and/or frequency.

4. The method according to claim 1, wherein at least one of the packet transceivers is allocated, on average, less than one time/frequency resource unit per guaranteed timeslot.

5. The method according to claim 1, further comprising periodically transmitting, by the network controller, a beacon signal.

6. The method according to claim 5, wherein the beacon signal comprises the resource allocation scheme.

7. The method according to claim 5, wherein the beacon signal comprises time synchronization information for the packet transceivers.

8. The method according to claim 1, wherein a set of shared timeslots follows each set of guaranteed timeslots.

9. The method according to claim 8, wherein the shared timeslots are opportunistically allocatable by each packet transceiver.

10. The method according to claim 9, wherein each packet transceiver uses carrier-sense multiple access with collision avoidance (CSMA/CA) when sensing whether any of the shared timeslots are free to use or not.

11. The method according to claim 8, further comprising periodically transmitting, by the network controller, a beacon signal, wherein one occurrence of the beacon signal, one occurrence of the set of guaranteed timeslots and one occurrence of the set of shared timeslots define one superframe.

12. The method according to claim 1, wherein the allocation is performed at medium access control (MAC) layer.

13. The method according to claim 1, wherein each packet transceiver is part of a gateway, circuit breaker, circuit protector, transformer, or switchgear.

14. A method for channel access in an industrial wireless network, the method being performed by a packet transceiver in the industrial wireless network, the method comprising:
   obtaining, from a network controller of the industrial wireless network, information about time/frequency resource units allocated to the packet transceiver, wherein the time/frequency resource units are provided in a set of guaranteed timeslots, wherein the guaranteed timeslots are timewise divided into slots and frequency wise divided into channels, and where one slot-channel pair defines one time/frequency resource unit, at least two allocated time/frequency resource units sharing a slot, wherein information of the allocated time/frequency resource units for each packet transceiver is provided in a resource allocation scheme, wherein each allocated time/frequency resource unit is allocated to a single packet transceiver;

mapping packets of its own traffic flows to its allocated time/frequency resource units in each set of guaranteed timeslots, wherein the packets are mapped according to priority-based scheduling of its own traffic flows and independently of any mapping of packets of other packet transceivers in the industrial wireless network; and after mapping packets of its own traffic flows to its allocated time/frequency resource units in each set of guaranteed timeslots, providing feedback, from the packet transceiver to the network controller about usage of the allocated time/frequency resource units, wherein the network controller dynamically updates the resource allocation scheme according to the feedback as obtained by the network controller from the packet transceiver.

15. A system for channel access in an industrial wireless network, the system comprising a network controller and packet transceivers, wherein:

the network controller is configured to allocate, to packet transceivers in the industrial wireless network, time/frequency resource units in a set of guaranteed timeslots, wherein the guaranteed timeslots are timewise divided into slots and frequency wise divided into channels, where one slot-channel pair defines one time/frequency resource unit, at least two allocated time/frequency resource units sharing a slot, wherein information of the allocated time/frequency resource units for each packet transceiver is provided in a resource allocation scheme, wherein a frequency-hopping pattern for the allocated time/frequency resource units is applied between consecutive guaranteed timeslots, the consecutive guaranteed timeslots not being separated by a shared timeslot, wherein each allocated time/frequency resource unit is allocated to a single packet transceiver;

the network controller is further configured to provide, to the packet transceivers, information about the time/frequency resource units allocated to the packet transceivers;

the packet transceivers are configured to map packets of their own traffic flows to their allocated time/frequency resource units in each set of guaranteed timeslots, wherein the packets for each packet transceiver are mapped according to priority-based scheduling of its own traffic flows and independently of any mapping of packets of other packet transceivers in the industrial wireless network;

the packet transceivers are further configured to after mapping packets of their own traffic flows to their allocated time/frequency resource units in each set of guaranteed timeslots, provide feedback, from the packet transceivers and to the network controller about usage of the allocated time/frequency resource units; and the network controller is further configured to dynamically update the resource allocation scheme according to the feedback as obtained by the network controller from the packet transceivers.

16. A packet transceiver for channel access in an industrial wireless network, the packet transceiver comprising processing circuitry, the processing circuitry being configured to cause the packet transceiver to:

obtain, from a network controller of the industrial wireless network, information about time/frequency resource units allocated to the packet transceiver, wherein the time/frequency resource units are provided in a set of guaranteed timeslots, wherein the guaranteed timeslots are timewise divided into slots and frequency wise divided into channels, and where one slot-channel pair defines one time/frequency resource unit, at least two allocated time/frequency resource units sharing a slot, wherein information of the allocated time/frequency resource units for each packet transceiver is provided in a resource allocation scheme, wherein each allocated time/frequency resource unit is allocated to a single packet transceiver;

map packets of its own traffic flows to its allocated time/frequency resource units in each set of guaranteed timeslots, wherein the packets are mapped according to priority-based scheduling of its own traffic flows and independently of any mapping of packets of other packet transceivers in the industrial wireless network; and after mapping packets of its own traffic flows to its allocated time/frequency resource units in each set of guaranteed timeslots, provide feedback, from the packet transceiver to the network controller about usage of the allocated time/frequency resource units, wherein the network controller dynamically updates the resource allocation scheme according to the feedback as obtained by the network controller from the packet transceiver.

17. Non-transitory computer readable medium storing a computer program for channel access in an industrial wireless network, the computer program comprising computer code which, when run on a network controller and a packet transceiver in the industrial wireless network causes the network controller and the packet transceiver to:

allocate, by the network controller and to packet transceivers in the industrial wireless network, time/frequency resource units in a set of guaranteed timeslots, wherein the guaranteed timeslots are timewise divided into slots and frequency wise divided into channels, where one slot-channel pair defines one time/frequency resource unit, at least two allocated time/frequency resource units sharing a slot, wherein information of the allocated time/frequency resource units for each packet transceiver is provided in a resource allocation scheme, wherein a frequency-hopping pattern for the allocated time/frequency resource units is applied between consecutive guaranteed timeslots, the consecutive guaranteed timeslots not being separated by a shared timeslot;

provide, by the network controller and to the packet transceivers, information about the time/frequency resource units allocated to the packet transceivers;

map, by the packet transceivers, packets of their own traffic flows to its allocated time/frequency resource units in each set of guaranteed timeslots, wherein the packets for each packet transceiver are mapped according to priority-based scheduling of its own traffic flows and independently of any mapping of packets of other packet transceivers in the industrial wireless network;

after mapping, by the packet transceivers, packets of their own traffic flows to their allocated time/frequency resource units in each set of guaranteed timeslots, provide feedback, from the packet transceivers and to the network controller about usage of the allocated time/frequency resource units; and dynamically update, by the network controller, the resource allocation scheme according to the feedback as obtained by the network controller from the packet transceivers.

18. Non-transitory computer readable medium storing a computer program for channel access in an industrial wireless network, the computer program comprising computer code which, when run on processing circuitry of a packet transceiver in the industrial wireless network, causes the packet transceiver to:

obtain, from a network controller of the industrial wireless network, information about time/frequency resource units allocated to the packet transceiver, wherein the time/frequency resource units are provided in a set of guaranteed timeslots, wherein the guaranteed timeslots are timewise divided into slots and frequency wise divided into channels, and where one slot-channel pair defines one time/frequency resource unit, at least two allocated time/frequency resource units sharing a slot, wherein information of the allocated time/frequency resource units for each packet transceiver is provided in a resource allocation scheme;

map packets of its own traffic flows to its allocated time/frequency resource units in each set of guaranteed timeslots, wherein the packets are mapped according to priority-based scheduling of its own traffic flows and independently of any mapping of packets of other packet transceivers in the industrial wireless network; and after mapping packets of its own traffic flows to its allocated time/frequency resource units in each set of guaranteed timeslots, provide feedback, from the packet transceiver to the network controller about usage of the allocated time/frequency resource units, wherein the network controller dynamically updates the resource allocation scheme according to the feedback as obtained by the network controller from the packet transceiver, wherein a frequency-hopping pattern for the allocated time/frequency resource units is applied between consecutive guaranteed timeslots, the consecutive guaranteed timeslots not being separated by a shared timeslot, wherein each allocated time/frequency resource unit is allocated to a single packet transceiver.

* * * * *